(12) United States Patent
Wang (10) Patent No.: US 9,680,747 B2
(45) Date of Patent: Jun. 13, 2017

(54) INTERNET PROTOCOL AND ETHERNET LOOKUP VIA A UNIFIED HASHED TRIE

(71) Applicant: Futurewei Technologies, Inc., Plano, TX (US)

(72) Inventor: Zixiong Wang, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 743 days.

(21) Appl. No.: 13/920,306

(22) Filed: Jun. 18, 2013

(65) Prior Publication Data

US 2014/0003436 A1  Jan. 2, 2014

Related U.S. Application Data

(60) Provisional application No. 61/664,794, filed on Jun. 27, 2012.

(51) Int. Cl.
| | | |
|---|---|---|
| *H04L 12/743* | (2013.01) | |
| *H04L 12/749* | (2013.01) | |
| *H04L 12/879* | (2013.01) | |
| *G06F 17/30* | (2006.01) | |
| *H04L 12/745* | (2013.01) | |

(52) U.S. Cl.
CPC .... *H04L 45/7457* (2013.01); *G06F 17/30982* (2013.01); *H04L 45/741* (2013.01); *H04L 45/748* (2013.01); *H04L 49/901* (2013.01)

(58) Field of Classification Search
None
See application file for complete search history.

(56) References Cited

U.S. PATENT DOCUMENTS

| | | | | |
|---|---|---|---|---|
| 6,018,524 A | * | 1/2000 | Turner | H04L 45/00 370/392 |
| 6,532,516 B1 | * | 3/2003 | Krishna | G11C 15/00 365/49.17 |
| 6,560,610 B1 | * | 5/2003 | Eatherton | G06F 17/3061 |
| 6,928,430 B1 | * | 8/2005 | Chien | G06F 17/30985 |
| 6,980,552 B1 | * | 12/2005 | Belz | H04L 12/5693 370/392 |

(Continued)

FOREIGN PATENT DOCUMENTS

| | | |
|---|---|---|
| CN | 101631086 A | 1/2010 |
| CN | 101741737 A | 6/2010 |
| EP | 2512073 A1 | 10/2012 |

OTHER PUBLICATIONS

Vamanan, Balajee et al. "TreeCAM: Decoupling Updates and Lookups in Packet Classification." ACM CoNEXT 2011, Dec. 6-9, 2011, Tokyo, Japan.*

(Continued)

*Primary Examiner* — Andrew Oh
(74) *Attorney, Agent, or Firm* — Conley Ross, P.C.

(57) ABSTRACT

An apparatus comprising a ternary content-addressable memory (TCAM) configured to store a root node for each of a plurality of tries resulting in a plurality of root nodes, and at least one non-TCAM memory configured to store associated data that identifies each of the plurality of root nodes, and store a plurality of network address prefixes represented by one or more subtries which belong to a trie in the plurality of tries, wherein each subtrie is locatable at least partially based on the associated data for the root node.

24 Claims, 6 Drawing Sheets

(56) References Cited

U.S. PATENT DOCUMENTS

| | | | |
|---|---|---|---|
| 7,249,149 B1* | 7/2007 | Eatherton | H04L 12/56 |
| 7,440,304 B1* | 10/2008 | Raj | G06F 17/30985 |
| | | | 365/189.06 |
| 7,478,109 B1* | 1/2009 | Panigrahy | G06F 7/02 |
| 7,539,153 B1 | 5/2009 | Liang | |
| 7,624,226 B1* | 11/2009 | Venkatachary | H04L 45/00 |
| | | | 711/108 |
| 7,707,217 B2* | 4/2010 | Allwright | G06F 17/30952 |
| | | | 707/758 |
| 7,739,445 B1* | 6/2010 | Venkatachary | G11C 15/00 |
| | | | 365/49.17 |
| 7,805,393 B1* | 9/2010 | Venkatachary | G06N 5/02 |
| | | | 706/48 |
| 7,986,696 B1* | 7/2011 | Miliavisky | H04L 45/54 |
| | | | 370/392 |
| 8,166,536 B1* | 4/2012 | Ammundi | H04L 63/0263 |
| | | | 711/101 |
| 8,566,276 B1* | 10/2013 | An | G11C 15/04 |
| | | | 707/608 |
| 8,625,604 B2* | 1/2014 | Bando | H04L 45/7457 |
| | | | 370/395.31 |
| 8,868,790 B2* | 10/2014 | Lovett | H04L 49/10 |
| | | | 370/463 |
| 8,880,507 B2 | 11/2014 | Kotha | |
| 8,880,556 B1* | 11/2014 | An | G11C 15/04 |
| | | | 707/791 |
| 9,049,157 B1* | 6/2015 | Miliavsky | H04L 45/00 |
| 2002/0129086 A1* | 9/2002 | Garcia-Luna-Aceves | H04L 45/00 |
| | | | 709/200 |
| 2003/0065878 A1* | 4/2003 | Krishna | G11C 15/00 |
| | | | 711/108 |
| 2003/0093616 A1* | 5/2003 | Slavin | G06F 17/30982 |
| | | | 711/108 |
| 2004/0008634 A1* | 1/2004 | Rangarajan | G06F 17/30961 |
| | | | 370/256 |
| 2004/0100950 A1* | 5/2004 | Basu | H04L 45/00 |
| | | | 370/389 |
| 2004/0111439 A1* | 6/2004 | Richardson | G06F 17/30985 |
| 2004/0111440 A1* | 6/2004 | Richardson | G06F 17/30625 |
| 2004/0193619 A1 | 9/2004 | Venkatachary | |
| 2004/0230583 A1* | 11/2004 | Testa | H04L 45/00 |
| 2004/0249803 A1 | 12/2004 | Vankatachary | |
| 2004/0254909 A1* | 12/2004 | Testa | H04L 45/00 |
| 2005/0083937 A1* | 4/2005 | Lim | H04L 45/7453 |
| | | | 370/392 |
| 2005/0237939 A1* | 10/2005 | Corl | G06N 99/005 |
| | | | 370/235 |
| 2006/0083247 A1* | 4/2006 | Mehta | H04L 45/00 |
| | | | 370/395.32 |
| 2006/0155915 A1* | 7/2006 | Pereira | H04L 45/00 |
| | | | 711/100 |
| 2006/0167843 A1* | 7/2006 | Allwright | G06F 17/30952 |
| 2006/0221832 A1* | 10/2006 | Muller | G06F 9/5077 |
| | | | 370/235 |
| 2006/0221990 A1* | 10/2006 | Muller | G06F 13/28 |
| | | | 370/412 |
| 2006/0253606 A1* | 11/2006 | Okuno | H04L 45/02 |
| | | | 709/238 |
| 2006/0253816 A1* | 11/2006 | Gould | H04L 63/12 |
| | | | 326/46 |
| 2007/0121632 A1 | 5/2007 | Zabarski | |
| 2007/0136331 A1* | 6/2007 | Hasan | G06F 17/30949 |
| 2008/0046423 A1* | 2/2008 | Khan Alicherry | G06F 17/30985 |
| 2008/0225874 A1* | 9/2008 | Lee | H04L 49/90 |
| | | | 370/412 |
| 2009/0150603 A1* | 6/2009 | Sahni | H04L 45/7453 |
| | | | 711/108 |
| 2010/0293327 A1* | 11/2010 | Lin | H04L 45/7457 |
| | | | 711/108 |
| 2010/0316051 A1* | 12/2010 | Song | H04L 45/742 |
| | | | 370/392 |
| 2011/0038375 A1* | 2/2011 | Liu | H04L 45/7453 |
| | | | 370/392 |
| 2011/0128960 A1* | 6/2011 | Bando | H04L 45/745 |
| | | | 370/392 |
| 2011/0255544 A1* | 10/2011 | Chidambaram | H04L 45/742 |
| | | | 370/395.32 |
| 2011/0307656 A1* | 12/2011 | Hamdi | H04L 45/7453 |
| | | | 711/108 |
| 2012/0066410 A1* | 3/2012 | Stefanakis | H04L 45/742 |
| | | | 709/245 |
| 2012/0072380 A1* | 3/2012 | Liu | H04L 45/7457 |
| | | | 706/12 |
| 2012/0078970 A1* | 3/2012 | Matsakis | G06F 17/30336 |
| | | | 707/800 |
| 2012/0137060 A1* | 5/2012 | Akerib | G11C 15/00 |
| | | | 711/105 |
| 2013/0031077 A1* | 1/2013 | Liu | G06F 7/02 |
| | | | 707/706 |
| 2013/0034096 A1 | 2/2013 | Hu et al. | |
| 2013/0117766 A1* | 5/2013 | Bax | G06F 9/4405 |
| | | | 719/323 |
| 2013/0294450 A1* | 11/2013 | Wang | H04L 45/748 |
| | | | 370/392 |
| 2014/0003436 A1 | 1/2014 | Wang | |
| 2015/0172191 A1* | 6/2015 | Wang | H04L 45/748 |
| | | | 370/392 |

OTHER PUBLICATIONS

Eatherton, W., et al., "Tree Bitmap: Hardware/Software IP Lookups with Incremental Updates," ACM SIGCOMM Computer Communication Review, vol. 34, Issue 2, Apr. 2004, pp. 97-122.

Wang, et al., U.S. Appl. No. 13/464,840, filed May 4, 2012, "Optimized Trie-Based Address Lookup", 47 pgs.

Foreign Communication from a Counterpart Application, PCT Application PCT/CN2013/078204, International Search Report, dated Oct. 17, 2013, 6 pages.

Foreign Communication from a Counterpart Application, PCT Application PCT/CN2013/078204, Written Opinion, dated Oct. 17, 2013, 4 pages.

Baboescu, E, et al., "A Tree Based Router Search Engine Architecture With Single Port Memories", 2005 IEEE, ISCA 05, Proceedings, 32nd International Symposium on Digital Object Identifier, 11 pgs.

"Internet Protocol, Darpa Internet Program, Protocol Specification," RFC 791, Sep. 1981, 50 pages.

Deering, S., et al., "Internet Protocol, Version 6 (IPv6) Specification," RFC 1883, Dec. 1995, 37 pages.

Foreign Communication From a Counterpart Application, PCT Application No. PCT/CN2014/093920, English Translation of International Search Report dated Mar. 25, 2015, 7 pages.

Foreign Communication From a Counterpart Application, PCT Application No. PCT/CN2014/093920, English Translation of Written Opinion dated Mar. 25, 2015, 5 pages.

Office Action dated Feb. 23, 2016, U.S. Appl. No. 14/108,581, filed Dec. 17, 2015, 31 pages.

* cited by examiner

INTERNET PROTOCOL AND ETHERNET LOOKUP VIA A UNIFIED HASHED TRIE

CROSS-REFERENCE TO RELATED APPLICATIONS

The present application claims priority to U.S. Provisional Patent Application No. 61/664,794 filed Jun. 27, 2012 by Zixiong Wang and entitled "A Unified Hashed Trie Algorithm for Internet Protocol and Ethernet Lookup", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In network communication, a router is typically coupled to a plurality of other routers through a plurality of network interfaces and can forward traffic to networks or sub-networks. Consequently, the router needs to maintain forwarding information, such as network address prefixes, for all sub-networks and interfaces in a database, known as a Forwarding Information Base (FIB).

Upon receiving a packet, the router performs a network address lookup. The lookup process finds the longest match between the destination address of the packet and a network address prefix and determines the corresponding outgoing interface. Hence, storing and accessing such information efficiently and intelligently can improve the lookup process, and thereby one of the most challenging problems in today's networking paradigm.

Trie lookup is one of the most popular network address lookup techniques used in a router. A trie is a tree data structure, wherein the position of a node in the tree represents a corresponding key. Particularly for representing network address prefixes in a FIB, a node in a trie represents a longest prefix match up to the position of the node.

In a traditional layer 3 router, different algorithms may be used for Internet Protocol (IP) lookup and Ethernet lookup. Typically, hashing is used for Ethernet lookup, and multi-bit trie is used for IP lookup. Memory space is statically provisioned among Ethernet hash tables and IP Forwarding Information Base (FIB) with memory space statically partitioned according to an expected usage ratio.

For data center (DC) and cloud applications, tera bit per second (Tb/s) IP and Ethernet lookups are required for both Top of Rack (TOR) switches and line cards of core switches, whereas a large amount of host routes may be leaked due to virtual machine migration. In addition, low latency may be important for these applications. Such requirements present a unique set of challenges that have not been addressed by lookup algorithms developed for traditional layer 3 router markets.

SUMMARY

In one embodiment, the disclosure includes an apparatus comprising a ternary content-addressable memory (TCAM) configured to store a root node for each of a plurality of tries resulting in a plurality of root nodes, and at least one non-TCAM memory configured to store associated data that identifies each of the plurality of root nodes, and store a plurality of network address prefixes represented by one or more subtries which belong to a trie in the plurality of tries, wherein each subtrie is locatable at least partially based on the associated data for the root node.

In another embodiment, the disclosure includes a method for network address lookup implemented by a router, the method comprising, in a TCAM, storing a root for each of a plurality of independent tries resulting in a plurality of roots, in at least one non-TCAM memory, storing associated data that identifies each of the plurality of root nodes, and storing a plurality of network address prefixes represented by one or more subtries which belong to a trie in the plurality of tries, wherein each subtrie is locatable partially based on the associated data for the root node.

In yet another embodiment, the disclosure includes a network router comprising a TCAM configured to store a root node for each of a plurality of independent tries resulting in a plurality of root nodes, a TCAM address (AD) table coupled to the TCAM and configured to store associated data for each of the plurality of root nodes, a hash table coupled to the TCAM AD table and configured to store a plurality of pointers, wherein each of the pointers is locatable by a hash key partially based on the associated data for each root node, a subtrie table coupled to the hash table and configured to store a plurality of network address prefixes represented by one or more subtries which belong to a trie in the plurality of independent tries, wherein each subtrie is locatable by each pointer, and a RE array coupled to the subtrie table and configured to store a plurality of REs corresponding to the plurality of network address prefixes.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A network router typically has a few network prefixes stored in a FIB. These prefixes are represented by specific nodes on a trie. During operation, a packet arrives at the router with a network address. Then, a lookup process is initiated, wherein a respective bit in the address is examined and a corresponding traversal through the trie is performed. During the traversal, whenever a node corresponding to a prefix in the FIB is found, the lookup process determines that the address matches the prefix. This process continues until the longest prefix that is stored in the FIB corresponding to the address is found. This match is known as the longest prefix match. Subsequent forwarding operations on the packet are performed based on this match.

Figure 1:
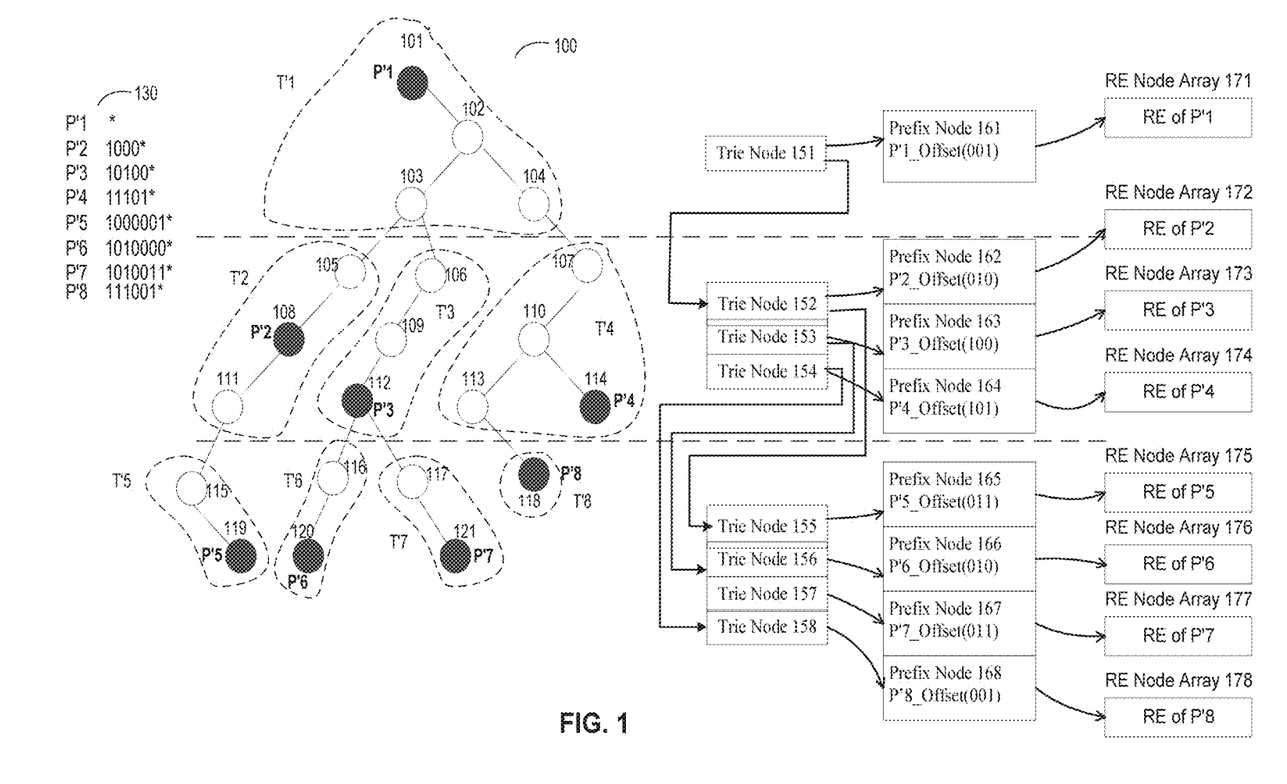
FIG. 1 illustrates an exemplary traditional trie-based lookup algorithm.

FIG. 1 illustrates an exemplary traditional trie-based lookup algorithm 10. In the algorithm 10, 8-bit-long IP addresses are assumed as an example, although the same concept can be applied to any other length of network addresses, such as 32-bit-long IP version 4 (IPv4) and 128-bit-long IPv6 addresses. As shown in FIG. 1, a prefix table 130 contains a list of network address prefixes, denoted as P'1-P'8, which may be stored in a FIB of a router. A trie 100 includes a plurality of nodes or vertexes 101-121 and represents prefixes shown in the prefix table 130. In trie 100, a left child node may indicate a 0 and a right child node may indicate a 1. For example, a right child node 102 from root node 101 corresponds to a 1, and a left child node 103 from the node 102 corresponds to a 0. All other nodes in trie 100 follow the same pattern. For example, traversing from root node 101 to leaf node 114 may go through one right traversal to node 102, one right traversal to node 104, one right traversal to node 107, one left traversal to node 110, and one right traversal to node 114. As a result, node 114 represents the prefix P'4 of 11101. Further, the nodes 101-121, as shown in FIG. 1, are numbered based on a breadth-first order, in which a parent node may precede a child node, and a left child node may precede a right child node.

Note that an asterisk symbol ("*") following a prefix denotes any combination of bits thereafter, and is not part of the prefix itself. For example, P'1 in the prefix table 130 represents "*" indicating that P'1 can be a prefix to any network address. Because root node 101 does not need any traversal in trie 100, node 101 represents P'1. For another example, P'4 represents "11101*" indicating that P'4 can be a prefix to any network address beginning with "11101." In other words, P'4 corresponds to network address prefix "11101" and is represented by node 114. Also, note that the trie 100 is constructed to represent prefixes stored in a network router. Hence, some of the nodes in trie 100 may not correspond to any prefix. These non-prefix or intermediate nodes are denoted using white circles in FIG. 1, while the prefix nodes are denoted using black circles.

In a lookup process, multiple bits of a network address may be examined at a time. The number of bits examined each time can be referred to as a stride size. As shown in FIG. 1, the trie 100 representing the prefixes P'1-P'8 may be divided into subtries, each representing a tree traversal of stride size. Thus, the trie 100 can be referred as a multi-bit trie. In the algorithm 10, we assume a stride size of 3. Trie 100 is divided into eight subtries, denoted as T'1-T'8, based on the prefixes per stride size. For a stride size of 3, all prefixes with fewer than 3 bits (prefix P'1) may be represented by subtrie T'1. Subtrie T'2 is a child subtrie of subtrie T'1, indicating that the first two bits (i.e., bits prior to the stride size) of all prefixes represented by subtrie T'2 represents a path traversal through subtrie T'1. For example, the first two bits of P'2 ("1000") corresponds to a path from node 101, via node 102, to node 103. Similarly, subtries T'3 and T'4 are child subtries of subtrie T'1, subtrie T'5 is a child subtrie of subtrie T'2, subtries T'6 and T'7 are child subtries of subtrie T'3, and subtrie T'8 is a child subtrie of subtrie T'4. Note that the child subtrie relationship is transitive. For example, because subtrie T'5 is a child subtrie of subtrie T'2, and subtrie T'2 is a child subtrie of subtrie T'1, subtrie T'5 is also a child subtrie of subtrie T'1.

A respective subtrie may be characterized by one or more prefixes associated with the subtrie, and one or more child subtries. Consequently, the subtrie can be represented by using the following data structures:

Trie node: one per subtrie to identify child subtries of the subtrie. In FIG. 1, trie nodes 151-158 represent subtries T'1-T'8, respectively. Trie node 151 points to trie nodes representing child subtries of subtrie T'1 (i.e., child subtrie nodes 152, 153, and 154). A trie node 151 may maintain a bitmap or other information corresponding to its child subtrie nodes.

Prefix node: one per subtrie to identify prefixes represented by the subtrie. In FIG. 1, prefix nodes 161-168 represent subtries T'1-T'8, respectively, and are pointed to by trie nodes 151-158, respectively. A prefix node 161 may maintain a bitmap corresponding or other information to a respective prefix represented by the subtrie.

Routing element (RE) array: one per subtrie. In FIG. 1, routing element arrays 171-178 represent subtries T'1-T'8, respectively, and are pointed to by prefix nodes 161-168, respectively. A prefix node 161 may include a pointer to array 171, wherein one or more elements in array 171 may contain forwarding information for prefix(es) identified by prefix node 161 (i.e., P'1). Forwarding information for a respective prefix can include a network address of a next hop network router and a corresponding outgoing interface.

A prefix identified by a prefix node can be represented using offset encoding. For example, each of the subtries in FIG. 1 can have up to 7 nodes due to a stride size of 3, even though some of the nodes are not shown in FIG. 1. These nodes can be numbered according to their breadth-first order, and the resulting prefix encoding is called offset encoding. For example, P'1 is the first node of subtrie T'1 and represented by a bitstring "001" corresponding to an offset encoding value of 1. For another example, P'3 is the fourth node of subtrie T'3 and represented by a bitstring "100" corresponding to an offset encoding value of 4.

During operation, suppose that a network router may receive a packet with an 8-bit IP address "10100110." To lookup this IP address, trie 100 is traversed with a stride size of 3. Specifically, the root subtrie T'1 is checked first against the first stride "101", and P'1 is recorded as a current longest prefix match (LPM) within the root subtrie T'1. Next, the first stride "101" may be used to select the child subtrie T'3, and P'3 in T'3 may be found to be the current LPM by checking against the second stride "001". Then, the second stride "001" may be used to select the child sub-trie T'7, and P7 may be found to be the current LPM by checking against the third stride "10". As "10" is the last stride, P7 is determined by the algorithm 10 to be the ultimate LPM. Once the ultimate LPM is found, the RE array 177 is accessed using the corresponding pointer in prefix node 167, and forwarding information for the match is retrieved from the array. In practice, the multi-bit tri-based algorithm 10 may require a significant memory space to store the trie nodes and high memory bandwidth to access trie nodes and prefix nodes on per trie stride basis. For data center and cloud applications, requirements such as high throughput (e.g., tera bits per second) and low latency may be difficult to meet using the existing algorithms.

Disclosed herein are apparatuses, algorithms, and methods for improving the process of network address lookup. This disclosure teaches a unified hashed trie based algorithm for IP and Ethernet lookups, which may target the data center and cloud applications. Specifically, this disclosure provides a ternary content-addressable memory (TCAM) assisted hashed trie algorithm for unified IP and Ethernet lookup, where both bitmap or offset encoding and rich prefix node encoding can be supported for subtrie encoding. Root nodes of independent tries may be stored in the TCAM, while other information such as TCAM addresses, pointers, and network addresses prefixes may be stored in a non-TCAM memory. Hash functions may be used in searching for a LPM. Overall, disclosed schemes may help to reduce the number of network address lookup stages, achieve higher capacity, and avoid memory fragmentation.

For data center and cloud applications, IP addresses and Ethernet addresses may be under the control of one entity, such as an operator. Thus, the operator has the freedom to dictate IP and Ethernet address allocation policies. For example, an IPv4 FIB may be divided into independent tries, where prefixes within a trie share a common root.

Figure 2:
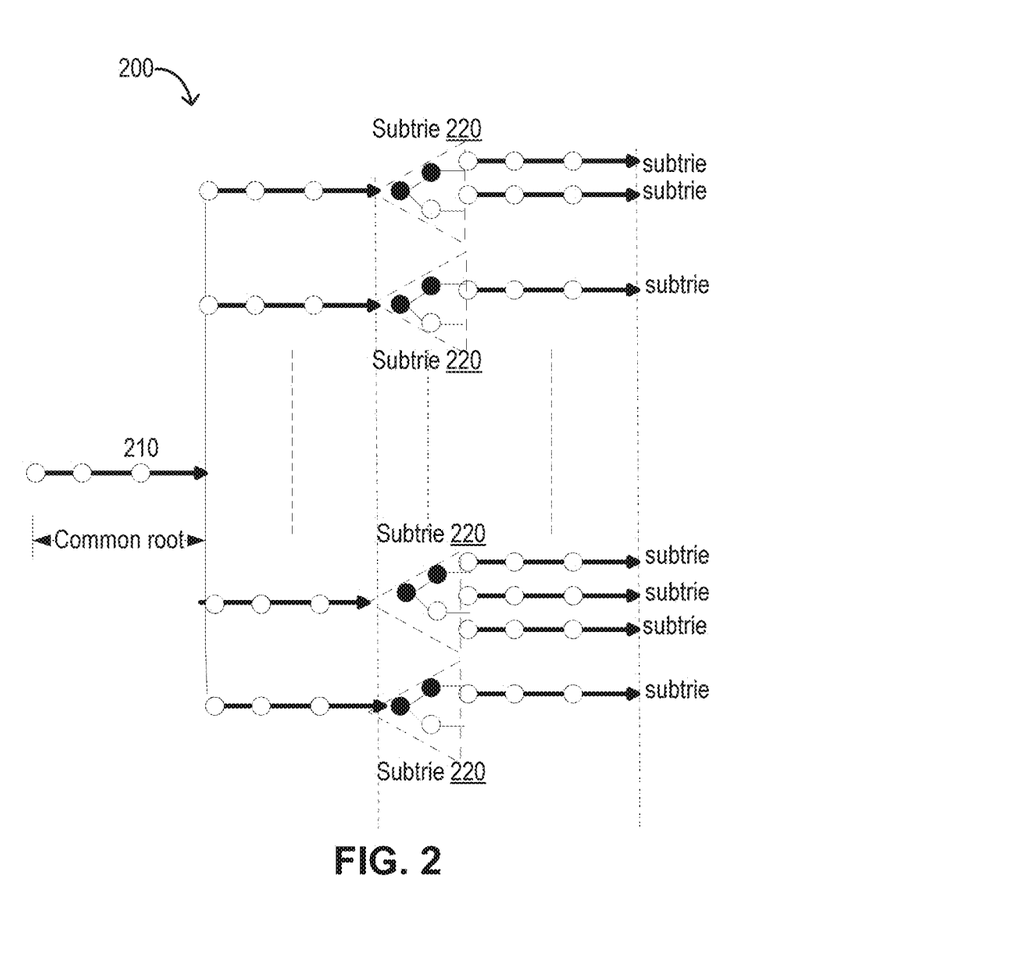
FIG. 2 illustrates an embodiment of an independent trie.

FIG. 2 illustrates an embodiment of an independent trie 200, which includes a root 210 and a plurality of subtries 220 sharing the common root 210. In some embodiments, the subtries 220 may share the same or similar distance to the root 210. The length of the root 210 may vary from one trie to another trie, e.g., falling in the range of 12 to 24 bits for IP Version 4 (IPv4) tries. In addition, due to virtual machine migration, a FIB may also have host routes that are full bits long (e.g., 32 b long for IPv4). Similarly, Ethernet or media access layer (MAC) addresses may be divided into independent tries, where MAC addresses within a trie share a common root. The length of a MAC root may vary from one trie to another trie, e.g., falling in the range of 24 to 40 bits. In addition, similar to IPv4 address allocation, MAC address allocation may be designed to allow route aggregation through MAC address prefixes. Due to the similarity between the allocation of IP and MAC addresses, herein a unified lookup algorithm is described to work with either IP addresses or MAC addresses.

Figure 3A:
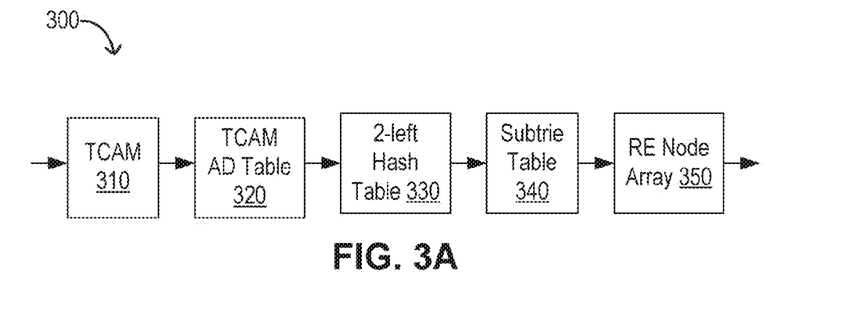
FIGS. 3A-3C illustrate various embodiments of a memory system.

FIG. 3A illustrates an embodiment of a memory system 300, in which disclosed lookup algorithms may operate. The memory system 300 may comprise a TCAM 310, a TCAM address (AD) table 320, a 2-left hash table 330, a subtrie table 340, and a RE node array 350 arranged as in FIG. 3. The TCAM 310 is a special type of CAM that allows a ternary matching state of "X" or "do not care" for one or more bits in a stored dataword, such as a network address. In comparison, a non-TCAM memory, such as a binary CAM uses data search words consisting entirely of 1 s and 0 s. The use of the TCAM 310 may help achieve low cost and area efficient search engine implementation for enterprise network processing unit (NPU) chipsets. Herein, the TCAM 310 may be configured to store a plurality of roots (e.g., the root 210) for independent IP and/or MAC tries (e.g., the trie 200). To differentiate IP and MAC roots, each root stored in the TCAM 310 may comprise a type field. Note that roots can have different lengths.

The associated data for a root (stored as an entry in the TCAM 310) may be stored in the TCAM AD table 320, in which an AD table entry may comprise the following fields:

RootLen, which indicates or specifies the length of the associated root;

IsPrefix, which specifies whether the associated root is a prefix;

RePtr, which specifies a RE pointer if IsPrefix is set; and

HashLen, which specifies the length of additional network address bits after the bits in the root. The length specified by HashLen determines generation of a hash key, which is further described below.

To lookup a network address, a hash key may be generated or computed to search for an entry in the hash table 330. In an embodiment, the hash key is computed using the following fields:

TCAMAddr, which specifies the address of a matching TCAM entry (note that, alternatively, a software-assigned identifier can be used in place of the TCAMAddr;) and PartKey, which specifies the extracted network address bits, whose number is defined by HashLen.

The hash key may be compared with a key stored or indicated in an entry of the hash table 330. Although a 2-left hash table is used as an example, it should be understood that any other suitable type of hash table may be used. Upon a hash hit, an associated entry in the subtrie table 340 may be read, where the entry represents a subtrie within the independent trie with its root stored in the matching TCAM entry. Then, the network address bits after the PartKey may be used to perform the LPM search in the subtrie. Upon a prefix match, the associated RE node array 350 may be read to find out a next hop. Note that herein, the TCAM AD table 320, the hash table 330, the subtrie table 340, and the RE array 350 may be implemented as data structures stored in at least one non-TCAM memory, such as a static random access memory (SRAM).

The encoding of a subtrie may use various schemes. For example, a relatively dense subtrie may be encoded as a bit map, while a relatively sparse subtrie may be encoded as a rich prefix node. Using rich prefix node, the associated PartKey may be added as part of the subtrie encoding for hash verification. More details on subtrie encoding can be found in U.S. patent application Ser. No. 13/464,840 filed May 4, 2012 by Z. Wang et al. and entitled "Optimized Trie-Based Address Lookup," which is incorporated herein by reference.

Figure 3B:
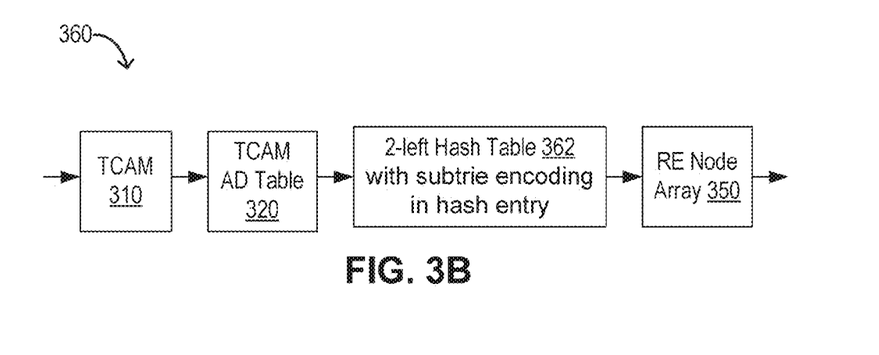

FIG. 3B illustrates an embodiment of a memory system 360, which may be similar to the memory system 300. In the interest of conciseness, the following descriptions may focus on aspects that are different. Instead of storing pointers in a hash table and network addresses prefixes in a separate subtrie table, the memory system 360 may comprise a 2-left hash table 362 with subtrie encoding in its hash entries. For example, the hash table 362 may comprise one or more hash entries, each of which may be configured to store a subtrie belonging to a trie. The subtrie may comprise one or more network address prefixes of the trie. In use, each hash entry, and thereby thus each subtrie, may be locatable by a hash key generated using a PartKey and associated data in the TCAM AD table 320. Further, one or more layers of a subtrie may be encoded in a hash entry as enhanced subtrie node(s) and/or rich prefix node(s). Since the hash table 362 may no longer need to store pointers pointing to subtries, the memory system 360 may reduce the number of lookup stages for an incoming network address (e.g., an IP or MAC address), when compared to the memory system 300.

Figure 3C:
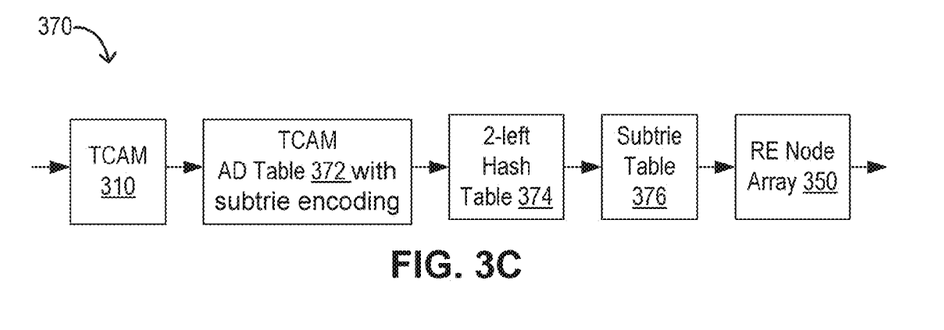

FIG. 3C illustrates an embodiment of a memory system 370, which may be similar to the memory system 300 or 360. In the interest of conciseness, the following descriptions may focus on aspects that are different. The memory system 370 may comprise a TCAM AD table 372 with subtrie encoding in its entries, a 2-left hash table 374, and a subtrie table 376. The TCAM AD table 372 may comprise one or more entries configured to store associated data that identifies a trie. In an embodiment, the associated data for the trie may comprise one or more PartKeys, and a PartKey may be encoded as a first layer of one or more enhanced subtrie node. The PartKey may be used in generating a hash key, which in turn may be used to locate a hash entry in the hash table 374. Further, the subtrie table 376 may comprise one or more subtries, and one or more layers of a subtrie may be encoded in the subtrie table 376 as enhanced subtrie node(s) and/or rich prefix node(s). Thus, it can be seen that layers of the enhanced subtrie nodes may be used to encode information in the associated data as well as network address prefix(es).

Figure 4:
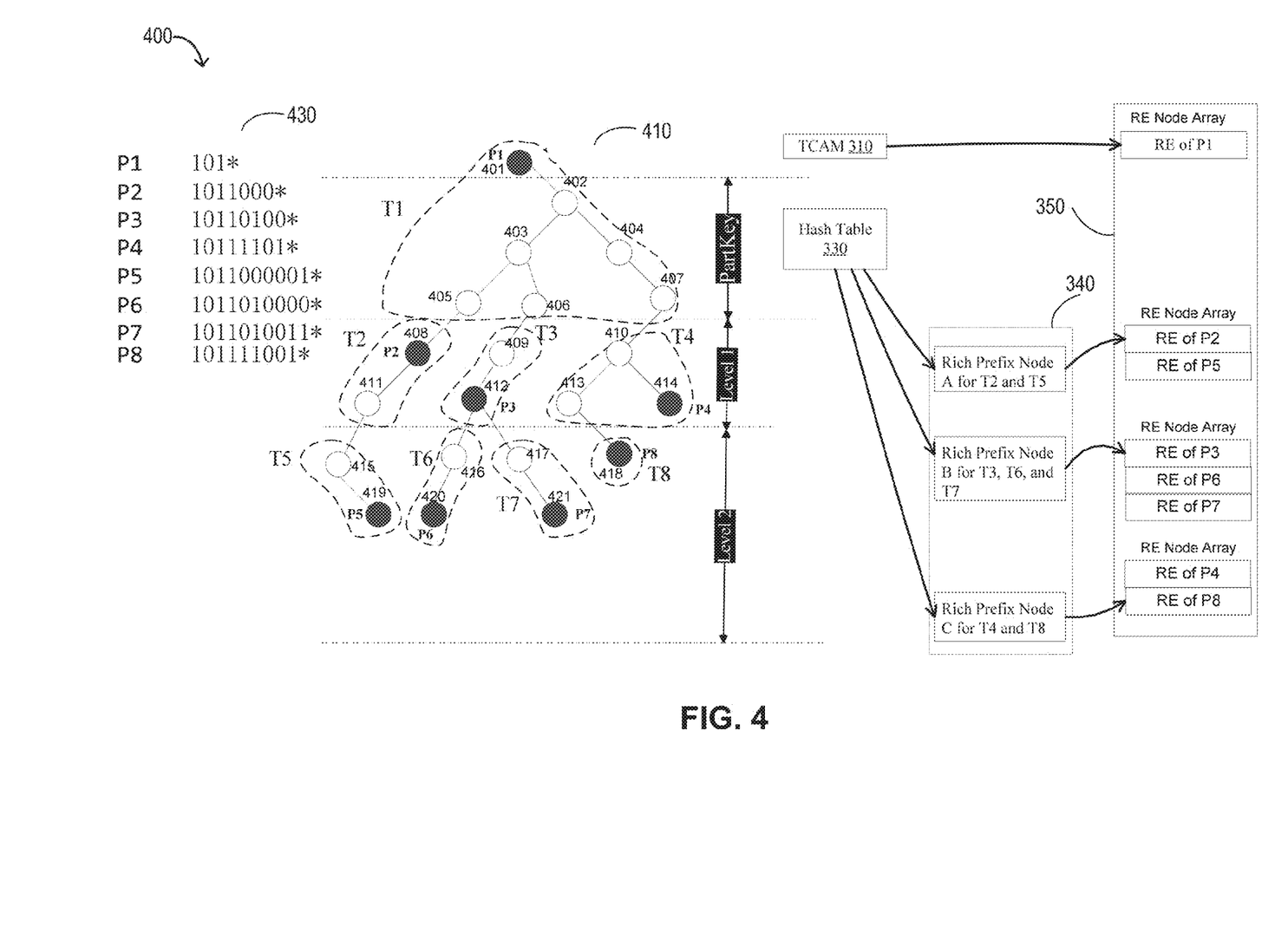
FIG. 4 illustrates an embodiment of a network address lookup algorithm.

FIG. 4 illustrates an embodiment of a network address lookup scheme 400, which may be implemented in a memory system, such as the memory system 300, 360, or 370. Since there may be a plurality of roots stored in a router FIB corresponding to a plurality of independent tries, each root needs to be locatable (e.g., by TCAMAddr). Note that a lookup procedure for each independent trie may be the same, and each independent trie may be represented by a root in the TCAM. In the interest of clarity, the lookup procedure for one of the independent tries is described with respect to FIG. 4 as an example. The scheme 400 adds three most significant bits (MSBs) with the value of "101" to P'1-P'8 shown in FIG. 1, resulting in prefixes denoted as P1-P8, which are included in a prefix table 430 shown in FIG. 4. Essentially, "101" is added through the root node of an independent trie 410, which includes a plurality of nodes or vertexes 401-421 and represents prefixes shown in the prefix table 430. Various aspects of the scheme 400 are similar to the algorithm 100, as a person of ordinary skill in the art will recognize, thus in the interest of conciseness, the following descriptions will mainly focus on aspects not yet covered.

As shown in FIG. 4, an independent trie 410 has a root node P1, which may be stored into a TCAM (e.g., the TCAM 310). Assume, for example, the trie 410 has a HashLen of 4 bits (in short as 4 b), and the HashLen is stored in a TCAM AD table (e.g., the TCAM AD table 320). In a hash table (e.g., the 2-left hash table 330), there may be 3 hash entries associated with the root P1: rich prefix nodes A, B, and C corresponding to PartKeys of 4'b1000, 4'b1010, and 4'b1110, respectively (4'b denotes a length of 4 bits). In the scheme 400, a stride size of 2 bits (instead of 3 bits in the trie 100) is assumed for the rich prefix nodes A, B, and C. Note that a stride size of 2 bits is used herein as an example, thus other stride sizes can be used. In practice, stride size used for rich prefix node encoding may be the same as or different from the stride size used for the construction of independent tries. Recall that rich prefix nodes may be used to encode sparse subtries, although the subtries disclosed herein may be encoded using any other algorithm.

Based on HashLen and stride size, the trie 410 may be divided into eight subtries denoted as T1-T8. T1 may be determined by the root P1 and HashLen, while T2-T8 may be determined by the stride size. Further, the subtries are arranged in a layered structure, with T2-T4 on Layer 1 (or Level 1) and T5-T8 on Layer 2 (or Level 2). Also, the rich prefix node A may encode P2 in T2 and P5 in T5. The rich prefix node B may encode P3 in T3, P6 in T6, and P7 in T7. Further, the rich prefix node C may encode P4 in T4 and P8 in T8.

Assume, for example, an IP address 10110100110 is to be searched using the scheme 400. To lookup this IP address, a TCAM (e.g., the TCAM 310) may be searched first to find a matching root P1 (has value 101). Based on the IsPrefix field in a TCAM AD table (e.g., the TCAM AD table 320), P1 is indicated as a prefix, thus P1 may be noted as a current LPM. Further, based on the HashLen field (set to 4 b) in the TCAM AD table, the next 4 bits 1010 may be extracted as a PartKey. Then, the PartKey may be used together with a TCAM address of P1 (specified by TCAMAddr) to compute a hash key, which may then be used to lookup a hash table (e.g., the 2-left hash table 330). If the hash key matches with a key stored in the hash table, a hash hit occurs, in which case a bucket of the hash table may be read to obtain a pointer to a subtrie table (e.g., the subtrie table 340), which is then used to read out the rich prefix node B.

Next, the remaining bits 0110 in the IP address 10110100110 may be used to search the rich prefix node B. Accordingly, P7 is found to be the ultimate LPM. Lastly, a RE node associated with P7 may be read to obtain a next hop. The next hop may specify an egress port number of a router, so data packets with the IP address 10110100110 are routed to the specified egress port.

As mentioned previously, there may be leaked host routes in data center and cloud applications. To deal with leaked host routes, the 2-left hash table and the subtrie table may be searched twice without enlarging the TCAM which may often be expensive. Specifically, the 2-left hash table and the subtrie table may be searched for a first time looking for a host route match. In the first search, the 2-left hash table may be searched using a hash key based on TCAMAddr and all network address bits after HashLen (denoted as hash key={TCAMAddr, all IP address bits after HashLen}). If the first search returns a hash hit, the host route being looked up is the desired LPM. Otherwise, if the first search returns a hash miss, the 2-left hash table and the subtrie table may be searched for a second time. The second search may use PartKey and TCAMAddr to compute the hash key, as described previously.

In some embodiments, the TCAM may store a prefix in addition to a common root which is a parent of the prefix. In this case, the TCAM may be enhanced to support multiple match indications. Specifically, the TCAM AD table may be read twice: a first time for matching the prefix and a second time for matching the common root. The 2-left hash table and the subtrie table may be searched twice, each as described before. On a miss from either the 2-left hash table or the subtrie table, the prefix stored in the TCAM may be determined as the ultimate LPM; otherwise, another longer prefix stored in the subtrie table may be determined as the ultimate LPM.

Multiple searches of the 2-left hash table and the subtrie table may be generalized to cases, in which there are multiple layers of rich prefix nodes associated with a given PartKey. For example, if the rich prefix node B in FIG. 4 has exceeded a pre-configured maximum size, the rich prefix node B may need to be split into 2 layers: one layer for subtrie T3 and another layer for subtries T6 and T7. In this case, each of T3, T6, and T7 may be considered to have been encoded as a rich prefix node. As a result, PartKeys for T6 and T7 have a length equaling the stride size plus the HashLen. As shown in FIG. 4, if T6 and T7 are implemented as different rich prefix nodes, PartKey for T6 is 6'b101000, and PartKey for T7 is 6'b101001. PartKeys for T3, T6, and T7 can be stored in an enhanced trie node using the same or similar encoding method as that of rich prefix nodes. In this case, a two-layered structure may be created, with the first level or layer being enhanced trie nodes, and the second layer being rich prefix nodes such as T3, T6, and T7. The enhanced trie node may be searched to identify a matching rich prefix node, and then the matching rich prefix node may be searched. For independent tries with more layers, this method can be extended further to store a first layer of enhanced trie nodes in the TCAM AD table, a second layer of enhanced trie nodes in the subtrie table, and a third and last layer of rich prefix nodes in the subtrie table. Accordingly, hash keys for the 2-left hash table may be generated from the PartKeys stored in the enhanced trie nodes.

In cases where a key may match multiple roots in a TCAM, the TCAM may be enhanced to support multiple match indications. In this case, the TCAM AD table may be read multiple times, each time for each of the matching common roots. Similarly, the 2-left table and the subtrie table may be searched multiple times.

Due to limitation of system resources such as bandwidth, sometimes it may be undesirable or impossible to search the 2-left table or the subtrie table for a plurality of times. In this case, a TCAM may be configured to store two roots for one independent trie: a first root (e.g., P1=3'b101) and a second root (e.g., P3=6'b10110100), wherein the first root is a prefix of the second root (referred to as a parent root). Accordingly, any network address matching P3 always matches P1. By choosing the parent root to be a prefix in the FIB, each of the 2-left table and the subtrie table may only need to be searched once. For example, by adding P3 into the TCAM as a second root (the first root is P1), any network address matching P3 will have either P3 as its LPM or a child of P3 as its LPM. Thus, searching a trie rooted at P3 may be enough to find the ultimate LPM, without searching the trie rooted at P1. As a result, the number of lookup stages may be reduced, and latency may be lowered.

For data center applications supporting virtual private networks (VPNs) or virtual switching instances (VSIs), it is advocated to design address allocation policy such that the VPNs and VSIs may share as much as possible the root of independent trees to minimize the size of the expensive TCAM. In this case, the algorithms described herein may be used with minor modification. Specifically, when computing a hash key which is later used to lookup a hash table, instead of using {TCAMAddr, PartKey} as the hash key, {TCAMAddr, PartKey, VPN ID/VSI ID} may be used as the hash key. In other words, an extra field VPN ID or VSI ID may be accounted for in computation of the hash key, wherein each VPN ID identifies a different VPN and each VSI ID identifies a different VSI.

Figure 5:
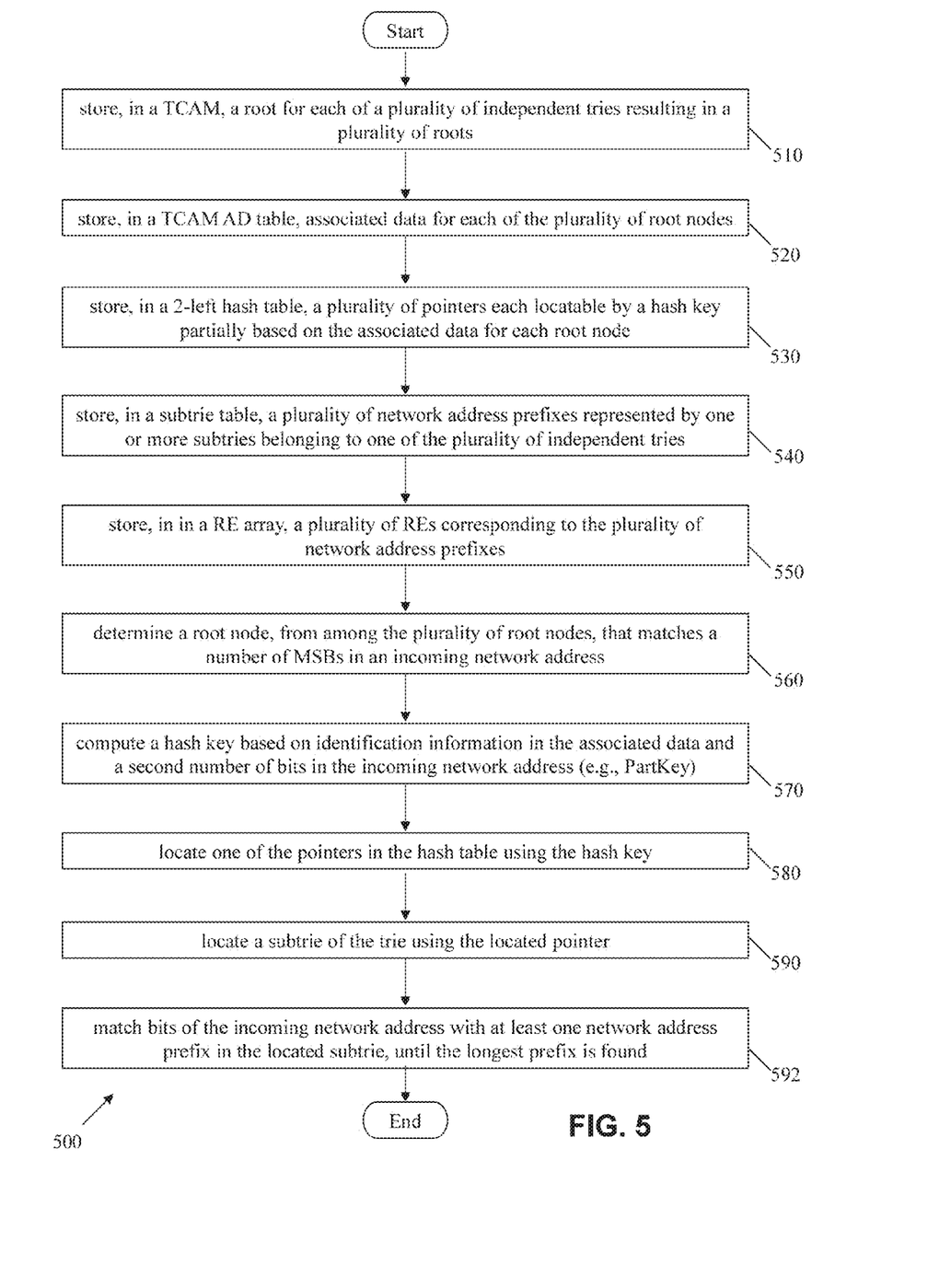
FIG. 5 illustrates an embodiment of a network address lookup method.

FIG. 5 illustrates an embodiment of a network address lookup method 500, which may be implemented by a memory system (e.g., the memory system 300, 360, or 370) equipped with a processor. In step 510, the method 500 may store, in a TCAM, a root for each of a plurality of independent tries resulting in a plurality of roots. In step 520, the method 500 may store, in at least one non-TCAM memory (e.g., in a TCAM AD table), associated data that identifies each of the plurality of root nodes. In step 530, the method 500 may store, in the non-TCAM memory (e.g., in a 2-left hash table), a plurality of pointers each locatable by a hash key partially based on the associated data for each root node. In step 540, the method 500 may store, in the non-TCAM memory (e.g., in a subtrie table), a plurality of network address prefixes belonging to a subtrie of the plurality of independent tries, wherein each subtrie is locatable by a pointer. In step 550, the method 500 may store, in the non-TCAM memory (e.g., in a RE array), a plurality of REs corresponding to the plurality of network address prefixes.

In step 560, the method 500 may determine a root node, from among the plurality of root nodes, that matches a first number of MSBs in an incoming network address. That is, the first number of MSBs have equal value with bits in the root node. Note that the incoming network address may be received by the memory system or obtained via any other means. In step 570, the method 500 may compute a hash key based on identification information contained in the associated data for the root node, (e.g., TCAMAddr or a software-defined identifier assigned in any suitable way to the root node) and a second number of bits in the incoming network address (e.g., PartKey), wherein the TCAM address is part of the associated data stored in the hash table, wherein the second number of bits trails the first number of MSBs, wherein a length of the second number of bits (e.g., HashLen) is specified by the associated data. In step 580, the method 500 may locate one of the pointers in the hash table using the hash key. In step 590, the method 500 may locate a subtrie in the subtrie table using the located pointer. In step 592, the method 500 may match bits of the incoming network address with the at least one network address prefix, until the longest prefix is found. As a person of ordinary skill in the art understands, variations of the method 500 may be possible and additional steps may be added in implementation, the details of which have been described herein. For example, when the subtrie table is searched multiple times, steps 580 and 590 may be repeatedly executed multiple times.

Figure 6:
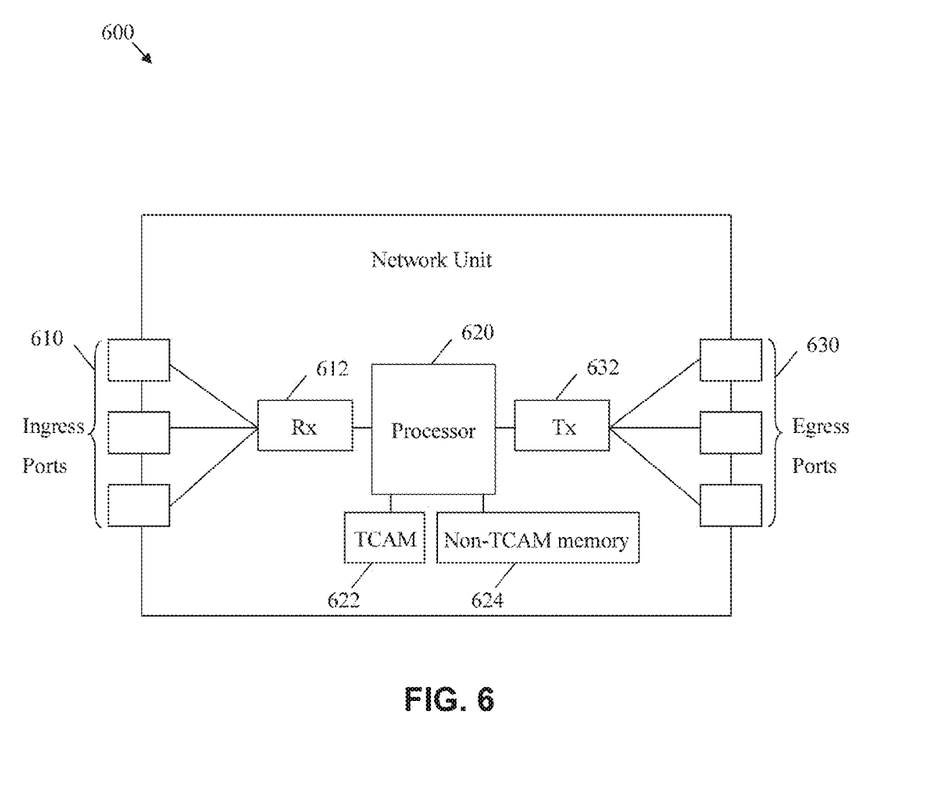
FIG. 6 illustrates an embodiment of a network device or unit.

FIG. 6 illustrates an embodiment of a network device or unit 600, which may be any device configured to transport packets through a network. For instance, the network unit 600 may be a network router wherein the memory system 300, 360, or 370 resides. The network unit 600 may comprise one or more ingress ports 610 coupled to a receiver 612 (Rx), which may be configured for receiving packets or frames from other network components. The network unit 600 may comprise a logic unit or processor 620 coupled to the receiver 612 and configured to process the packets or otherwise determine which network components to send the packets. The processor 620 may be implemented using hardware, or a combination of hardware and software.

The network unit 600 may further comprise a TCAM 622 and at least one non-TCAM memory 624. The TCAM 622 may be configured to store roots and/or prefixes for independent tries. A non-TCAM memory 624 may be configured to store a TCAM AD table, a hash table, a subtrie table, and a RE node array. The network unit 600 may also comprise one or more egress ports 630 coupled to a transmitter 632 (Tx), which may be configured for transmitting packets or frames to other network components. Note that, in practice, there may be bidirectional traffic processed by the network unit 600, thus some ports may both receive and transmit packets. In this sense, the ingress ports 610 and the egress ports 630 may be co-located or may be considered different functionalities of the same ports that are coupled to transceivers (Rx/Tx). The processor 620, the TCAM 622, the non-TCAM memory 624, the receiver 612, and the transmitter 632 may also be configured to implement or support any of the schemes and methods described above, such as the scheme 400 and the method 500.

It is understood that, by programming and/or loading executable instructions onto the network unit 600, at least one of the processor 620, the TCAM 622, and the non-TCAM memory 624 can be changed. As a result, the network unit 600 may be transformed in part into a particular machine or apparatus (e.g. a memory system or subsystem having the functionality taught by the present disclosure).

The executable instructions may be stored on the non-TCAM memory 624 and loaded into the processor 620 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner, as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
a ternary content-addressable memory (TCAM) configured to store a root node for each of a plurality of tries resulting in a plurality of root nodes;
at least one non-TCAM memory configured to:
store associated data that identifies each of the plurality of root nodes; and
store a plurality of network address prefixes represented by a plurality of subtries which belong to a trie in the plurality of tries, wherein each subtrie is locatable at least partially based on the associated data for the root node, and wherein at least one of the plurality of network address prefixes is encoded as a rich prefix node that comprises one or more layers of multiple subtries of the plurality of subtries; and
a processor coupled to the TCAM and the at least one non-TCAM memory, wherein the processor is configured to match an incoming network address with a longest prefix from the plurality of network address prefixes, wherein the processor is configured to match by:
determining a root node, from among the plurality of root nodes, that matches a first number of most significant bits (MSBs) in the incoming network address;
computing a hash key based on identification information in the associated data and a second number of bits in the incoming network address, wherein the identification information identifies the root node, wherein the second number of bits, denotable as PartKey, trails the first number of MSBs, wherein a length of the second number of bits, denotable as HashLen, is specified in the associated data;
locating, among the plurality of subtries, a subtrie based on the hash key; and matching bits of the incoming network address with at least one network address prefix in one or more layers of the subtrie, until the longest prefix is found.

2. The apparatus of claim 1, wherein the associated data for the plurality of root nodes are stored in a TCAM address (AD) table, and wherein the at least one non-TCAM memory is further configured to store, in a routing element (RE) array, a plurality of REs corresponding to the plurality of network address prefixes.

3. The apparatus of claim 1, wherein the plurality of network address prefixes are stored in a subtrie table, wherein the at least one non-TCAM memory is further configured to store a plurality of pointers in a hash table, wherein locating the subtrie based on the hash key comprises:
locating a pointer in the hash table using the hash key; and
locating the subtrie using the pointer.

4. The apparatus of claim 3, wherein the TCAM is further configured to store a prefix represented by a child node in the trie, and wherein matching the incoming network address further comprises searching the hash table and the subtrie table at least twice based on the prefix and the root node stored in the TCAM.

5. The apparatus of claim 1, wherein the plurality of network address prefixes are stored in a hash table comprising one or more entries, and wherein the subtrie is located in one of the entries using the hash key.

6. The apparatus of claim 1, wherein the identification information is a TCAM address corresponding to the root node or a software-defined identifier assigned to the root node.

7. The apparatus of claim 1, wherein the associated data for the plurality of root nodes are stored in a TCAM address (AD) table, wherein at least part of the associated data is encoded as a first layer of one or more enhanced subtrie nodes.

8. The apparatus of claim 1, wherein the trie comprises one or more layers of enhanced trie nodes and a last layer of rich prefix nodes, and wherein matching the incoming network address with the at least one network address prefix comprises searching the subtrie until a last layer of the one or more layers of the subtrie.

9. The apparatus of claim 1, wherein the subtries belonging to the trie are in one or more layers, wherein the subtrie is encoded as an enhanced trie node or a rich prefix node which is a leaf node, and wherein matching the incoming network address with the at least one network address prefix comprises searching the subtrie until a last layer of the one or more layers of the subtrie.

10. The apparatus of claim 1, wherein computing the hash key is further based on a virtual private network (VPN) identifier (ID) or a virtual switching instance (VSI) ID.

11. The apparatus of claim 1, wherein the stored network address prefixes and the incoming network address comprise internet protocol (IP) addresses.

12. The apparatus of claim 1, wherein the stored network address prefixes and the incoming network address comprise media access layer (MAC) addresses.

13. The apparatus of claim 1, wherein the processor is further configured to encode part of at least one of the network address prefixes as an enhanced trie node with encoding adapted from rich prefix nodes that comprises one or more layers.

14. The apparatus of claim 1, wherein the incoming network address corresponds to a host route, wherein matching the incoming network address comprises:
determining a leak of the host route;
generating the hash key using the identification information in the associated data and all the bits of the incoming network address except the bits contained in the root node; and
searching a hash table in the at least one non-TCAM memory using the hash key.

15. The apparatus of claim 1, wherein the TCAM is further configured to store a second root node, wherein the second root node comprises more bits than a first root node and starts with all bits of the first root node, wherein matching the incoming network address comprises generating a hash key based on a TCAM address corresponding to the second root node, and wherein no hash key is generated based on the first root node.

16. The apparatus of claim 1, wherein the at least one non-TCAM memory comprises a static random access memory (SRAM).

17. A method for network address lookup implemented by a router, the method comprising:
storing, in a ternary content-addressable memory (TCAM), a root node for each of a plurality of independent tries resulting in a plurality of root nodes;
storing, in at least one non-TCAM memory, associated data that identifies each of the plurality of root nodes; and
storing, in the at least one non-TCAM memory, a plurality of network address prefixes represented by a plurality of subtries which belong to a trie in the plurality of independent tries, wherein each subtrie is locatable partially based on the associated data for the root node; and
encoding, in a processor coupled to the TCAM and the at least one non-TCAM memory, part of at least one of the plurality of network address prefixes as an enhanced trie node with encoding adapted from rich prefix nodes that comprise one or more layers of multiple subtries of the plurality of subtries;
determining, in the processor, a root node, from among the plurality of root nodes, that matches a first number of most significant bits (MSBs) in an incoming network address;
computing, in the processor, a hash key based on identification information in the associated data and a second number of bits in the incoming network address, wherein the identification information identifies the root node, wherein the second number of bits, denotable as PartKey, trails the first number of MSBs, wherein a length of the second number of bits, denotable as HashLen, is specified in the associated data;
locating, among the plurality of subtries, a subtrie based on the hash key; and
matching, in the processor, bits of the incoming network address with at least one network address prefix in one or more layers of the subtrie, until a longest prefix is found.

18. The method of claim 17, wherein computing the hash key is further based on a virtual private network (VPN) identifier (ID) or a virtual switching instance (VSI) ID.

19. The method of claim 17, wherein the stored network address prefixes and the incoming network address comprise at least one of internet protocol (IP) and media access layer (MAC) addresses.

20. The method of claim 17, wherein the incoming network address corresponds to a host route, the method further comprising determining a leak in the host route, and wherein the hash key is computed using all bits of the incoming network address except the bits contained in the root node.

21. The method of claim 17, further comprising:
storing, in the TCAM, a second root node starting with all bits of a first root node and comprising more bits than the first root node; and
generating a hash key based on a TCAM address corresponding to the second root node, wherein no hash key is generated based on the first root node.

22. A network router comprising:
a ternary content-addressable memory (TCAM) configured to store a root node for each of a plurality of independent tries resulting in a plurality of root nodes;
a TCAM address (AD) table coupled to the TCAM and configured to store associated data for each of the plurality of root nodes;
a hash table coupled to the TCAM AD table and configured to store a plurality of pointers, wherein each of the pointers is locatable by a hash key at least partially based on the associated data for each root node;
a subtrie table coupled to the hash table and configured to store a plurality of network address prefixes represented by a plurality of subtries which belong to a trie in the plurality of independent tries, wherein each subtrie is locatable by one of the pointers; and
a routing element (RE) array coupled to the subtrie table and configured to store a plurality of REs corresponding to the plurality of network address prefixes.

23. The network router of claim 22, further comprising a processor configured to:
determine a root node, from among the plurality of root nodes, that matches a first number of most significant bits (MSBs) in an incoming network address;
compute a hash key based on a TCAM address and a second number of bits, denotable as PartKey, in the incoming network address, wherein the TCAM address is part of the associated data stored in the TCAM AD table, wherein the second number of bits trails the first number of MSBs, wherein a length of the second number of bits is specified by the associated data;
locate one of the pointers in the hash table using the hash key;
locate a subtrie in the subtrie table using the located pointer; and
match bits of the incoming network address with at least one network address prefix in one or more layers of the subtrie, until a longest prefix is found.

24. The network router of claim 23, wherein the stored network address prefixes and the incoming network address comprise at least one of internet protocol (IP) and media access layer (MAC) addresses.

* * * * *